US008600098B2

(12) United States Patent
Sampedro Diaz et al.

(10) Patent No.: US 8,600,098 B2
(45) Date of Patent: Dec. 3, 2013

(54) METHOD FOR PROCESSING A SATELLITE IMAGE AND/OR AN AERIAL IMAGE

(75) Inventors: Luis Sampedro Diaz, Mountain View, CA (US); Daniel Rosario, Santa Cruz, CA (US)

(73) Assignee: Volkswagen AG, Wolfsburg (DE)

( * ) Notice: Subject to any disclaimer, the term of this patent is extended or adjusted under 35 U.S.C. 154(b) by 1259 days.

(21) Appl. No.: 12/238,119

(22) Filed: Sep. 25, 2008

(65) Prior Publication Data

US 2010/0074555 A1    Mar. 25, 2010

(51) Int. Cl.
*G06K 9/00* (2006.01)
*G06K 9/36* (2006.01)
*G09G 5/00* (2006.01)
*H04N 9/74* (2006.01)

(52) U.S. Cl.
USPC ............ 382/100; 382/284; 345/629; 348/584

(58) Field of Classification Search
None
See application file for complete search history.

(56) References Cited

U.S. PATENT DOCUMENTS

| 6,233,523 | B1 * | 5/2001 | Sood ............................. 701/409 |
| 7,453,479 | B2 * | 11/2008 | Le et al. ........................ 345/698 |
| 7,595,816 | B1 * | 9/2009 | Enright et al. ................ 348/150 |
| 2008/0109153 | A1 * | 5/2008 | Gueziec ........................ 701/117 |
| 2009/0322502 | A1 * | 12/2009 | Ozaki ........................... 340/435 |
| 2010/0061701 | A1 * | 3/2010 | Iwane .............................. 386/95 |
| 2010/0166256 | A1 * | 7/2010 | Kmiecik et al. .............. 382/103 |

OTHER PUBLICATIONS

Fruh et al. "Constructing 3D City Models by Merging Aerial and Ground Views", Nov. 2003, Computer Graphics and Applications, IEEE, vol. 23 Issue:6, pp. 52-61.*

* cited by examiner

*Primary Examiner* — Randolph I Chu
(74) *Attorney, Agent, or Firm* — Kenyon & Kenyon LLP

(57) ABSTRACT

In a method for processing a satellite image and/or aerial image, unwanted objects are able to be removed from the satellite image and/or aerial image. Geographical positions of objects pictured in the satellite and/or aerial image are determined, at least one photo is taken at ground level at each and/or in the respective immediate vicinity of the geographical positions determined, and these photos taken at ground level are superimposed on the satellite image and/or aerial image.

17 Claims, 2 Drawing Sheets

METHOD FOR PROCESSING A SATELLITE IMAGE AND/OR AN AERIAL IMAGE

FIELD OF THE INVENTION

The present invention relates to a method for processing a satellite image and/or an aerial image.

BACKGROUND INFORMATION

Satellite images and/or aerial images show the surface of the earth at the instant at which they were taken. For this reason, the satellite and/or aerial image may contain information that is unwanted and not up-to-date, which must be filtered out of the satellite images and/or aerial images depending on their use. In particular, the use of satellite images and/or aerial images for producing photo-realistic maps for navigation systems in vehicles requires that obstacles such as vehicles, trees, etc., which are present in satellite images and/or aerial images when they are taken, be filtered out. If this were not done, when using the unprocessed satellite images and/or aerial images for producing photo-realistic maps for navigation systems in vehicles, there would be a feeling of uneasiness with regard to driving over these virtual obstacles. In addition, for example, the traffic conditions shown in the images do not correspond to the reality. Ultimately, a coherent superimposition of the satellite and/or aerial image with real-time data with respect to the current traffic conditions, the current road and/or parking-place occupancy, etc., is thereby made impossible.

SUMMARY

Example embodiments of the present invention provide a method for processing a satellite image and/or an aerial image by which satellite and/or aerial images are able to be produced that, to the greatest extent possible, are free of unwanted objects.

A method according to example embodiments of the present invention includes: determining geographical positions of objects pictured in the satellite image and/or aerial image; taking at least one photo at ground level at each and/or in the respective immediate vicinity of the geographical positions determined; and superimposing the satellite image and/or aerial image with the photos taken at ground level.

A ground-level photo may include a photo which allows an observer of this photo on a screen (e.g., at a customary resolution) to perceive a motor vehicle on a road (especially as such).

Therefore, the geographical positions of objects such as vehicles, trees, etc., pictured in the satellite image and/or aerial image are determined, and ground-level photos of at least one image are subsequently taken at each and/or in the respective immediate vicinity of these positions, these photos taken at ground level then being superimposed on the satellite image and/or aerial image. The photos taken at ground level may no longer contain the object representing an obstacle, which means a satellite image and/or aerial image is produced successively that, to the greatest extent possible, is free of such interfering objects. This provides that such object-free satellite and/or aerial images are suitable for producing photo-realistic maps for navigation systems in vehicles without the feeling of driving over virtual objects. In addition, a real-time traffic-condition display is possible by superimposing relevant traffic-condition data on the satellite image and/or aerial image processed according to the method described herein. In addition to the real-time traffic conditions, such real-time data which can be superimposed on a reworked satellite image and/or aerial image may also include, for example, road-construction warnings, traffic-light phases, accident reports, parking-space accessibility, etc.

The geographical position(s) of the objects may be determined using an image processing algorithm, e.g., boundary-, edge-, and/or border-detection algorithm. This is used by a suitable electronic data-processing device on the unprocessed satellite and/or aerial image. A method for processing the satellite image and/or aerial image which is automated to the greatest extent possible is thus made available, in which the satellite and/or aerial image may be processed with the least effort and therefore advantageously from the standpoint of time and cost.

A list of the determined geographical positions of the objects may be created which, for example, may be accomplished using a suitable algorithm that cooperates with the image processing algorithm, e.g., a boundary-detection algorithm, such that the geographical positions of the objects determined by the latter are stored directly in a list of geographical positions, in doing which, for example, the geographical positions may be provided in the form of coordinates expressed in degrees of longitude and degrees of latitude. This list of geographical positions may subsequently be stored on a server of an operator of the method, which may be accessed as desired.

At least a portion of the list may be transmitted to at least one motor vehicle furnished with a camera. To that end, the motor vehicle must be equipped with an electronic device capable of receiving the list, it being possible to use a navigation system already present for that purpose. When the motor vehicle reaches a geographical position from the list sent to the motor vehicle, at least one photo may be taken at ground level at and/or in the immediate vicinity of the geographical position of the object by the camera disposed on the motor vehicle, it being possible to use the photo for superimposition on the satellite image and/or aerial image. For example, the reaching of a geographical position of an object may be indicated in some manner to the driver, after which he/she activates the existing camera. In doing so, the driver of the motor vehicle may take into account whether a corresponding ground-level photo is or would be useful at the given instant of reaching the geographical position of the object, which, for example, is not the case when, e.g., an object in the form of a parked vehicle is still located at the geographical position determined, so that taking a ground-level photo at this geographical position and superimposition on a satellite and/or aerial image carried out on this basis would not be very meaningful, since the unwanted object could not thereby be removed from the satellite image and/or aerial image. The camera for taking ground-level photos may be designed in any manner and is situated at a suitable location on the motor vehicle.

A photo may be taken at ground level automatically by the camera as soon as the motor vehicle reaches a geographical position of an object from the list. This refinement may be used for the automation of the method, which is practicable in easy fashion and with the least expenditure.

Before taking a photograph, the motor vehicle may take into account signals from on-board sensors, e.g., radar, lidar, ultrasonic sensors, etc., to detect obstacles, such as other vehicles, in a target region of the intended photograph. By doing so, a determination may be made as to whether such a photograph would be meaningful or not and, consequently, whether to take the photograph and/or send it to the server.

The geographical position of the motor vehicle may be recorded at a predetermined instant and/or in predefined time intervals. For example, upon start of its engine, the motor vehicle, with the aid of a suitable electronic device, may transmit its current geographical position to a server of a provider of the method. For example, on the basis of the acquired geographical position of the motor vehicle, geographical positions of objects present in a surrounding area of predefined size with respect to the geographical position of the motor vehicle are selected from the list and transmitted to the motor vehicle. If the destination and/or route of the driver is known, e.g., by the driver having set a destination and/or route in the navigation system, the destination, the route, and/or a calculated route may be sent to the server, e.g., together with the current location, in which case the server returns a list of geo-coded obstacles along the route. These features make it possible to reduce the volume of data transmitted considerably, since only a relatively short partial list is transmitted to a motor vehicle compared to the complete list of geographical positions of objects.

The ground-level photo produced by the camera may be transmitted to a central server. For example, this may take place after each individual ground-level photo or only after a certain number of ground-level photos. For example, the ground-level photos are transmitted automatically, in order to obtain a method with the lowest possible expenditure. For example, the central server may be operated by a provider of the method, suitable algorithms and database structures for implementing the method, e.g., being available on this server.

Images may only be photographed at ground level at predefined times of the day and/or when certain weather conditions are present. This may provide for creating ground-level photos of high quality, which, for example, is not the case for a photograph at night. If the geographical position of a motor vehicle is acquired, then, taking time information and/or weather information into account, it may be weighed or determined whether to transmit a suitable list of geographical positions of objects to the motor vehicle.

It may be provided to superimpose further information on the processed satellite image and/or aerial image, the further information, e.g., being real-time information. Relevant information is, for example, the current traffic conditions, up-to-date road-construction warnings, instantaneous traffic-signal phases, up-to-date accident reports, current parking-space accessibility, etc.

Example embodiments of the present invention may be particularly suitable in connection with ground-level imagery databases, such as those acquired by a vehicle that is driven through every street in a particular region, that may be used in conjunction with a search service, e.g., Google Street View. Such databases may provide for images of a business that is searched. If an object, e.g., a truck, happens to be located in front of a business at the moment that a photograph is taken, an image of the front of the business may be obscured. Thus, for example, latitude and longitude coordinates of such a business may be added in a target list so that when a vehicle is driven by such a business and conditions are acceptable, e.g., clear weather, no obstacle(s) in front, a picture is taken and sent to the server.

Thus, a method is provided for processing a satellite image and/or aerial image, with which easily and in as automated a manner as possible, the satellite and/or aerial image is able to be cleared of unwanted objects representing obstacles.

According to an example embodiment of the present invention, a method for processing at least one of (a) a satellite image and (b) an aerial image includes: determining geographical positions of objects pictured in the satellite image and/or aerial image; taking at least one photograph at ground level at least one of (a) at each and (b) in a respective immediate vicinity of the determined geographical positions; and superimposing the at least one of (a) the satellite image and (b) the aerial image with the photograph taken at ground level.

The geographical positions of the objects may be determined in accordance with an image processing algorithm, e.g., a boundary-detection algorithm.

The method may include creating a list of the determined geographical positions of the objects.

The method may include transmitting at least a portion of the list to at least one motor vehicle equipped with a camera.

A photograph may be taken at ground level automatically by the camera as soon as the motor vehicle reaches a geographical position of an object from the list.

The method may include recording the geographical position of the motor vehicle at least one of (a) at a predetermined instant and (b) in predefined time intervals.

The method may include selecting from the list and transmitting to the motor vehicle, in accordance with the recorded geographical position of the motor vehicle, geographical positions of objects present in a surrounding area of predefined size with respect to the geographical position of the motor vehicle.

The method may include transmitting the ground-level photograph taken by the camera to a central server.

The photograph may be taken at ground level at least one of (a) only at predefined times of the day and (b) given presence of certain weather conditions.

The method may include superimposing the at least one of (a) the satellite image and (b) the aerial image with further information.

The method may include superimposing with further information the at least one of (a) the satellite image and (b) the aerial image superimposed with the photograph taken at ground level.

The further information may include real-time information.

The further information may include: (a) current traffic conditions; (b) up-to-date road-construction warnings; (c) instantaneous traffic-signal phases; (d) up-to-date accident reports; (e) current parking-space availability; and/or (f) current parking-space accessibility.

The geographic positions may be determined by determining coordinates in degrees of longitude and degrees of latitude.

The method may include determining a geographical position of the motor vehicle by a navigation system provided in the motor vehicle.

Further features and aspects of example embodiments of the present invention are described in more detail below with reference to the appended Figures.

DETAILED DESCRIPTION

Figure 1:
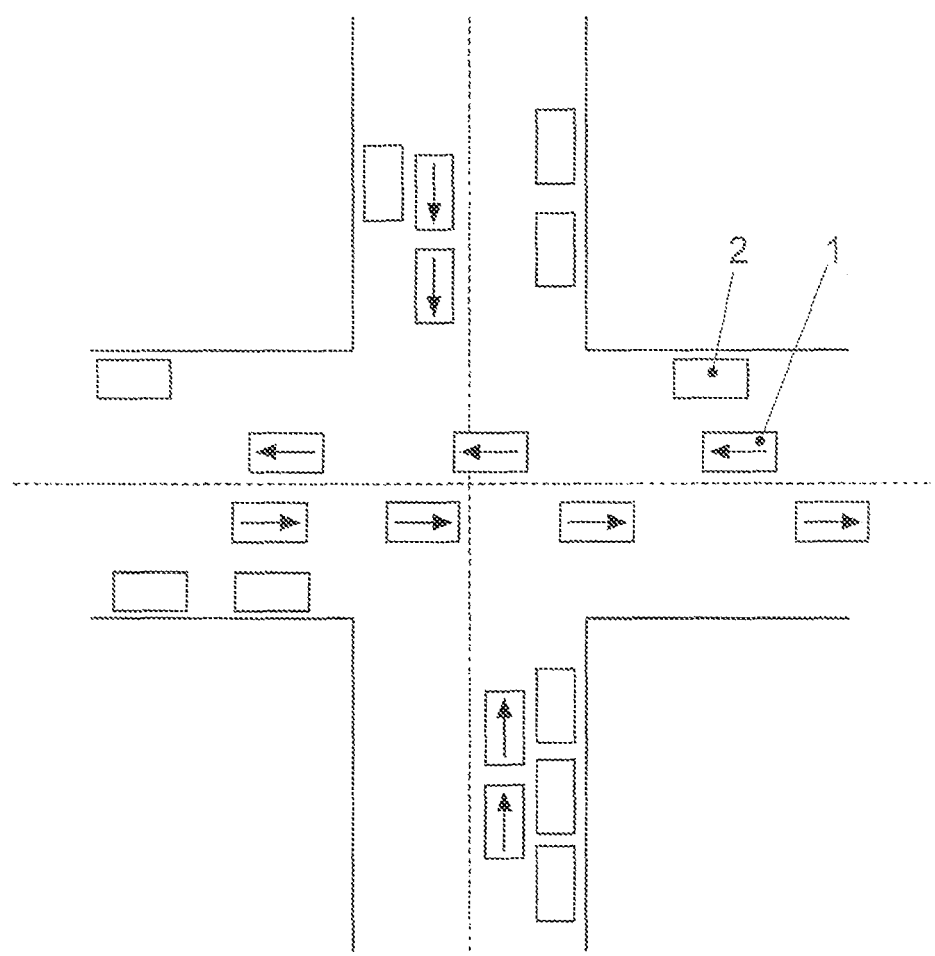
FIG. 1 schematically illustrates an exemplary embodiment of a satellite image and/or aerial image having objects.

FIG. 1 schematically illustrates an exemplary embodiment of a satellite image and/or aerial image of an intersection. At the instant this satellite image and/or aerial image is photographed, both moving vehicles 1 and parked vehicles 2 are in the area of the intersection. If such a satellite image and/or aerial image were to remain unprocessed and made available in the form shown to a navigation system of a motor vehicle for displaying photo-realistic maps, then when passing through the intersection, the impression would be conveyed via the navigation system of running over moving motor vehicles 1 and/or parked vehicles 2. Moreover, superimposing such an unprocessed satellite and/or aerial image with, for example, a current traffic status would be very bewildering, since further vehicles would be displayed in addition to motor vehicles 1 and 2 already present in FIG. 1, which would lead to a very confusing display that would demand unsuitably high attention from a driver of a motor vehicle to safely drive the vehicle. The parking situation illustrated in FIG. 1 does not correspond to reality either, so that real-time information regarding this also cannot be superimposed over the satellite image and/or aerial image without obtaining a confusing display. From FIG. 1, it becomes clear that there is considered to be a need for a method to process the satellite image and/or aerial image in order to be able to make reworked satellite and/or aerial images available to a navigation system of a motor vehicle such that, to the greatest degree possible, no objects are present in the satellite and/or aerial images, thus permitting a representation of the earth's surface which is as realistic as possible, and in addition, allowing a meaningful superimposition of satellite and/or aerial images.

Figure 2:
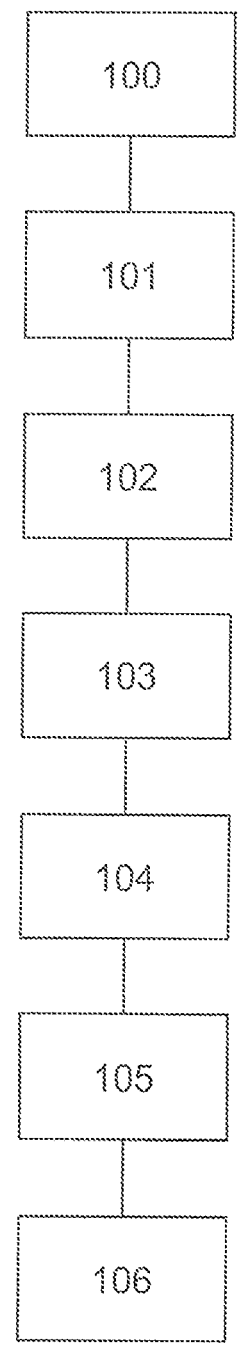
FIG. 2 is a flowchart of a method according to an example embodiment of the present invention.

FIG. 2 is a flow chart of a method according to an exemplary embodiment of the present invention. In this context, initially in step 100, a satellite image and/or aerial image of a portion of the earth's surface is produced which contains a plurality of objects and is used as raw material for the present method. In step 101, the satellite and/or aerial image is processed using an image processing algorithm, e.g., a boundary-detection algorithm, via which the geographical positions of objects pictured in the satellite and/or aerial image are determined, which, in particular, is accomplished using coordinates expressed in degrees of longitude and degrees of latitude. By this use of the image processing algorithm, a list of geographical positions of the objects is created which may be is stored on a central server and may be able to be retrieved from there via suitable devices such as navigation systems in vehicles, for example. In step 102, the geographical position of a motor vehicle equipped with a camera for taking ground-level photos is recorded. For example, the geographical position of the motor vehicle is recorded upon start of the motor-vehicle engine, after which the geographical position of the motor vehicle is transmitted to the central server. Using a further application program, in step 103, based on the acquired geographical position of the motor vehicle, a partial list is selected from the list of geographical positions of objects created in step 101 and transmitted to the motor vehicle. In this step 103, it is further taken into account what the time of day is at the position of the motor vehicle and what weather conditions exist there, in order to prevent ground-level photos from being taken which are not suitable for superimposing over the satellite image and/or aerial image because of the lack of quality. In this manner and by the creation of a partial list from the list of geographical positions of objects, the volume of data to be transmitted within the framework of the method is significantly reduced, which has a positive effect on the costs associated with the method. In step 104, an image is photographed at ground level by the camera disposed on the motor vehicle, the ground-level photographing, e.g., taking place automatically as soon as the motor vehicle reaches a geographical position of an object from the partial list transmitted to the motor vehicle in step 103. In following step 105, the ground-level photo produced in step 104 is sent to a central server and used there for superimposition on the satellite and/or aerial image, it thereby being possible to remove one or more unwanted objects from the satellite and/or aerial image per ground-level photo. Step 106 includes making the processed satellite image and/or aerial image available for a further use, this satellite and/or aerial image being processed successively until all unwanted objects have been removed from the satellite and/or aerial image. Such an object-free satellite image and/or aerial image may be used for creating photo-realistic maps for navigation system(s) in motor vehicles.

The exemplary embodiments described herein and illustrated in the figures are used for explanation and should not be considered to be restrictive.

What is claimed is:

1. A method for processing at least one of (a) a satellite image and/or (b) an aerial image, comprising:
   determining geographical positions of objects pictured in the satellite image and/or aerial image;
   taking at least one photograph at ground level at least one of (a) at each and/or (b) in a respective immediate vicinity of the determined geographical positions; and
   superimposing the at least one of (a) the satellite image and/or (b) the aerial image with the photograph taken at ground level;
   wherein the superimposing includes
      removing objects pictured in the satellite image and/or aerial image based on the photograph taken at ground level that no longer contains the objects; and
      adding objects not pictured in the satellite image and/or aerial image and pictured in the photograph taken at ground level.

2. The method according to claim 1, wherein the geographical positions of the objects are determined in accordance with an image process algorithm.

3. The method according to claim 1, further comprising creating a list of the determined geographical positions of the objects.

4. The method according to claim 3, further comprising transmitting at least a portion of the list to at least one motor vehicle equipped with a camera.

5. The method according to claim 4, wherein a photograph is taken at ground level automatically by the camera as soon as the motor vehicle reaches a geographical position of an object from the list.

6. The method according to claim 4, further comprising recording the geographical position of the motor vehicle at least one of (a) at a predetermined instant and/or (b) in predefined time intervals.

7. The method according to claim 6, further comprising selecting from the list and transmitting to the motor vehicle, in accordance with the recorded geographical position of the motor vehicle, geographical positions of objects present in a surrounding area of predefined size with respect to the geographical position of the motor vehicle.

8. The method according to claim 4, further comprising transmitting the ground-level photograph taken by the camera to a central server.

9. The method according to claim 1, wherein the photograph is taken at ground level at least one of (a) only at predefined times of the day and/or (b) given presence of certain weather conditions.

10. The method according to claim 1, further comprising superimposing the at least one of (a) the satellite image and (b) the aerial image with further information.

11. The method according to claim 10, wherein the further information includes real-time information.

12. The method according to claim 10, wherein the further information includes at least one of (a) current traffic conditions, (b) up-to-date road-construction warnings, (c) instantaneous traffic-signal phases, (d) up-to-date accident reports, (e) current parking-space availability, and/or (f) current parking-space accessibility.

13. The method according to claim 1, further comprising superimposing with further information the at least one of (a) the satellite image and/or (b) the aerial image superimposed with the photograph taken at ground level.

14. The method according to claim 13, wherein the further information includes real-time information.

15. The method according to claim 1, wherein the geographic positions are determined by determining coordinates in degrees of longitude and degrees of latitude.

16. The method according to claim 4, further comprising determining a geographical position of the motor vehicle by a navigation system provided in the motor vehicle.

17. The method according to claim 1, wherein the geographical positions of the objects are determined in accordance with a boundary-detection algorithm.

* * * * *